B. W. ELDER.
PROCESS FOR PRODUCING CATALYZERS AND FOR EFFECTING HYDROGENATION THEREBY.
APPLICATION FILED JUNE 7, 1918.
1,331,906.
Patented Feb. 24, 1920.
2 SHEETS—SHEET 1.
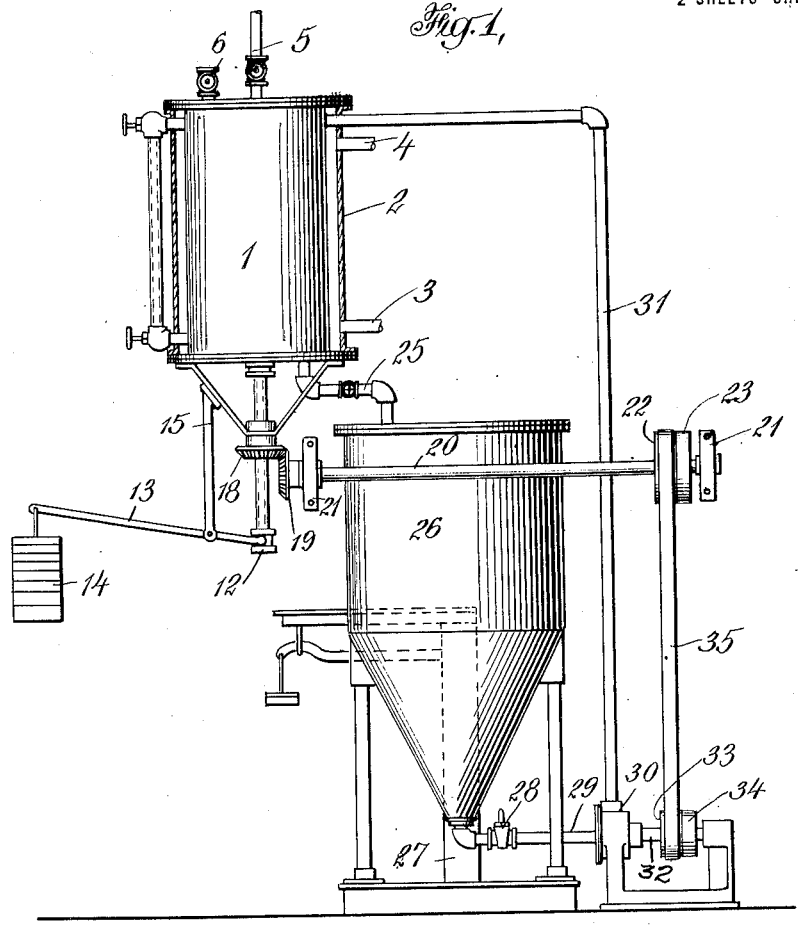
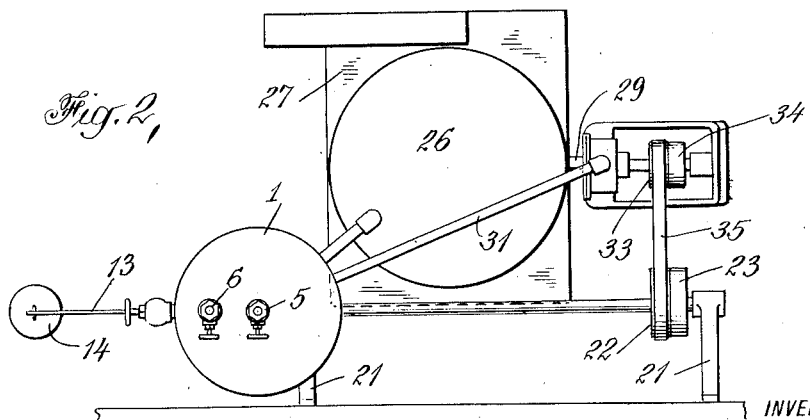
INVENTOR
BENJAMIN W. ELDER.
ATTORNEY

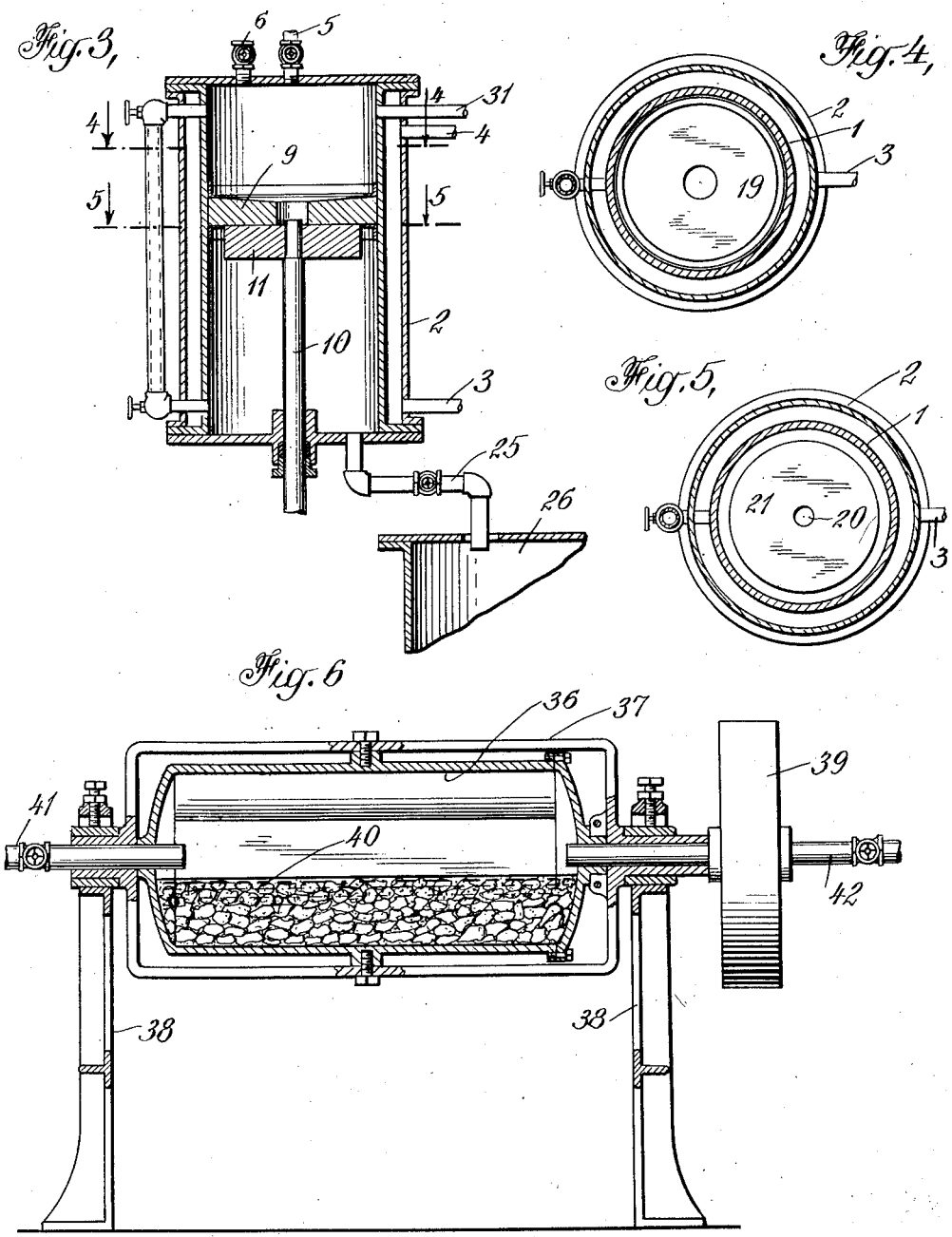

UNITED STATES PATENT OFFICE.

BENJAMIN W. ELDER, OF LOS ANGELES, CALIFORNIA, ASSIGNOR TO THE ALLBRIGHT-NELL COMPANY, A CORPORATION OF ILLINOIS.

PROCESS FOR PRODUCING CATALYZERS AND FOR EFFECTING HYDROGENATION THEREBY.

1,331,906.  Specification of Letters Patent.  Patented Feb. 24, 1920.

Application filed June 7, 1918. Serial No. 238,657.

*To all whom it may concern:*

Be it known that I, BENJAMIN W. ELDER, a citizen of the United States, and a resident of the city of Los Angeles, in the county of Los Angeles and State of California, have invented certain new and useful Improvements in Processes for Producing Catalyzers and for Effecting Hydrogenation Thereby; and I do hereby declare that the following is a full, clear, and exact description of the same, reference being had to the accompanying drawings, and to the numerals of reference marked thereon, which form a part of this specification.

This invention relates to the catalytic hydrogenation of unsaturated liquids, for example, the unsaturated fatty acids and their esters or glycerids. More specifically the invention relates to a combined process of effecting such hydrogenation and simultaneously producing a finely pulverulent catalyzer.

The invention is based upon the discovery that nickel in bulk form, which possesses practically no catalytic activity, can be provided with surfaces which are highly catalytic, and that the hydrogenation of fatty oils and the like can be readily effected by causing the oil to flow over such catalytically active surfaces, in the presence of hydrogen, and at a temperature appropriate to the catalytic hydrogenation.

The invention is based upon the further discovery that such catalytic hydrogenation can advantageously be combined with the maintenance of the catalytic activity of such surfaces, and with the production therefrom, by mechanical means, as by attrition or abrasion, of a finely pulverulent nickel catalyzer which will be maintained in suspension in the fatty oil or other liquid, and which will further promote the hydrogenation process. As the result of this composite process, not only is the oil hydrogenated to a greater or less degree, but there is simultaneously produced a finely pulverulent catalyzer in suspension therein, so that the product of the composite process is a composite product containing the finely divided catalyzer in suspension in the hydrogenated fatty oil or other liquid.

The catalytic hydrogenation of fatty oils, as heretofore practised, has been commonly effected with the aid of finely divided nickel catalyzers produced by chemical processes of reduction, with hydrogen at elevated temperatures of reducible nickel compounds. Such catalyzers have also been mounted upon various types of carriers, such as pumice stone, kieselguhr, charcoal, etc., in order further to promote the catalytic activity. Catalyzers thus produced are usually of an extremely sensitive and pyrophoric character and require that special conditions be observed in their production, among which may be mentioned purity of reagents utilized in converting the raw metallic nickel into a reducible nickel compound, careful observation and regulation of the temperatures at which such compounds are reduced, and protection of the sensitive and usually pyrophoric catalyzers from contact with the atmosphere.

The improved process of the present invention greatly simplifies the catalytic hydrogenation of oils is that it eliminates the elaborate and extensive chemical processes of producing the catalyzer, and in that it enables advantage to be taken of the raw catalytic metal, after a simple mechanical treatment thereof, which mechanical treatment may, moreover, form a part of the catalytic hydrogenation process itself.

It is accordingly, also an object of the present invention to provide a process for the hydrogenation of materials wherein the material to be treated is caused to flow over a catalytically active metallic surface which is operated upon by an element acting upon the surface to maintain said surface catalytically active, the operation proceeding in the presence of hydrogen, and at a temperature appropriate to the hydrogenation.

It is also an object of the present invention to provide a process for hydrogenating materials wherein the material to be treated is streamed onto the catalytically active metal surfaces, in the presence of hydrogen and at the hydrogenation temperature, and subjected to the action of mechanisms moving over such surfaces and bearing thereon with pressure, for maintaining such surfaces catalytically active.

It is furthermore an object of this invention to provide a process for effecting hydrogenation by grinding or abrading the catalyzer metal while submerged in, or subjected to, a stream of heated oil or fat in an atmosphere of hydrogen with simultaneous hydrogenation and production of a finely pulverulent catalyzer.

It is furthermore an object of this invention to provide a process for effecting hydrogenation of oils, fats, or other bodies wherein the catalytically active metal surfaces are subjected to a grinding and abrasive action while submerged or subjected to the flow of the heated oil or fat to be treated, and with hydrogen passed between the abrading and abraded surfaces as the oil flows therebetween.

In its broader aspects, the present invention involves the bringing of the fluid to be hydrogenated, together with hydrogen, into contact with catalytically active surfaces which have been produced by suitable mechanical means, and causing the liquid and hydrogen to flow over such surfaces at a temperature appropriate to the hydrogenation operation.

Nickel, in bulk form, has substantially no catalytic activity, and is not generally available for use directly as a catalyzer. It has been the common practice, in order to make the nickel available for catalytic purposes, to convert the raw metallic nickel, usually by solution and precipitation processes, into the form of reducible nickel compounds and to reduce such compounds, with hydrogen at elevated temperatures in order to produce an active nickel catalyzer from the substantially non-catalytic raw metallic nickel. Nevertheless, I have found that the raw metallic nickel can be provided directly with surfaces which are highly catalytic, and sufficiently so for effecting the catalytic hydrogenation of oil therewith, by subjecting the raw nickel surfaces, possessing practically no catalytic activity, to such mechanical treatment as will result in providing catalytically active surfaces of high catalytic activity.

After the catalytically active surfaces have been thus produced, the fatty oil or other liquid to be hydrogenated, is caused to circulate in contact therewith in the presence of hydrogen, and at a temperature appropriate to the catalytic hydrogenation.

In the preferred embodiments of the invention, the catalytically active surfaces, over which the fatty oil is caused to circulate, are subjected to attrition or abrasion during the circulation of the oil thereover, so that renewed catalytic activity will be continuously imparted to such surfaces during the progress of the hydrogenation process. This combined hydrogenation and attrition or abrasion is moreover most advantageously combined with the added use of a finely divided abrasive which will very materially promote the abrading operation, and bring about the production of considerable amounts of finely divided catalyzer particles of such a minute state of subdivision that they can be readily picked up and carried by the fatty oil and maintained in suspension therein. As suitable abrasives may be mentioned finely divided silica, pumice, quartz, etc., of appropriate fineness, for example, of a fineness such as will pass through a 200 mesh screen.

The catalytically active surfaces can, however, in many cases be produced without the presence of a fatty oil or other protective liquid simply by causing the abrasion of nickel upon nickel, or of nickel upon nickel with the added intervention of a finely divided abrasive. When no liquid is present, the catalytically active surfaces will still be developed either with or without the simultaneous production of considerable amounts of finely pulverulent nickel catalyzer. When no liquid is present, the surfaces may be further protected, if desired, by a protective gas, such as hydrogen. When, subsequently, the fatty oil or other liquid is caused to circulate over the catalytically active surfaces, in the presence of hydrogen, and at an appropriate hydrogenation temperature, hydrogenation will be caused to take place.

Inasmuch as it is necessary for the hydrogen and oil to be brought into intimate contact with the catalytically active surfaces, various means may be provided for promoting the desired intimacy of contact.

The bulk nickel which has been provided with the catalytically active surfaces, may be maintained stationary, and the oil and hydrogen caused to circulate over, at appropriate temperatures. The stationary surfaces may also, during the progress of the hydrogenation, be subjected to such attrition or abrasion as will maintain them of high catalytic activity, for example, by acting thereon with an abrasive material.

In the preferred embodiments of the invention, the catalyzer is provided in the form of a moving body so that the catalytically active surfaces will be caused to act upon each other during the progress of the hydrogenation process, preferably with the assistance of a finely divided abrasive which will assist in bringing about the simultaneous production of a finely pulverulent catalyzer in considerable amount. Such a finely divided catalyzer thus produced, and maintained in suspension in the oil, will further promote the catalytic hydrogenation of the oil, in the presence of hydrogen; so that the hydrogenation process may, in such cases, be regarded as effected in part by the catalytically active surfaces and in part by the finely pulverulent catalyzer produced by mechanical means from such catalytically active surfaces.

It will be evident that various types of apparatus are available for the practice of the present invention. Certain specific types are illustrated in the accompanying drawings, and the invention will be more fully described in connection therewith. In the drawings, Figure 1 is a side elevation of one form of apparatus for carrying out the process;

Fig. 2 is a top plan view thereof;

Fig. 3 is a vertical section of part of the apparatus of Fig. 1, with parts shown in elevation, and with parts omitted.

Fig. 4 is a detail section on the line 4—4 of Fig. 3;

Fig. 5 is a detail section on 5—5 of Fig. 3;

Fig. 6 is a sectional side elevation of another form of apparatus for effecting the hydrogenation of the material.

In the form of apparatus illustrated in Figs. 1 to 4 inclusive, I have shown a cylindrical receptacle having a heating jacket 2 with inlet and outlet 3 and 4, said receptacle being also provided with a hydrogen inlet 5, and a blow-off cock 6, in the top thereof. Mounted rigidly within the receptacle 1, as clearly shown in Fig. 3, is a block of nickel or other suitable catalyzer material 9, having a central aperture therethrough. Extending upwardly through a stuffing box in the bottom wall of said receptacle 1, is a shaft 10, which is capable of both rotational and longitudinal movement in said receptacle, and mounted on the upper end of said shaft is a rubbing or abrasive block 11, which at all times bears upwardly against the under surface of the stationary metal block 9. In order to insure the rubbing block 11, bearing upwardly against the stationary catalyzer block of metal 9, the lower end of said shaft 10 is provided with a collar 12, and engaging said collar is the yoked end of a lever 13, provided with a number of removable weights 14, on its outer end, said lever being pivoted on the lower end of a bracket arm 15, which is in turn rigidly secured to one of a pair of bracket arms 16, mounted beneath the receptacle 1. Said bracket arms 16, serve to support a bearing through which said shaft 10 extends, and beneath which is mounted a bevel pinion 18, which is feathered on said shaft, so that longitudinal movement of the shaft may take place and yet said shaft is caused to rotate with the pinion. Said pinion 18, receives its drive from another bevel pinion 19, which is journaled in suitable bearings 21, secured to any suitable support, said shaft also having secured thereon tight and loose pulleys 22 and 23 respectively.

Mounted on the side of a receptacle 1, is a gage glass by which the level of the contents within the receptacle may be ascertained, and leading outwardly from the bottom of said receptacle is a pipe connection 25, which communicates through the top wall of another receptacle or receiver 26. Said receiver 26, is supported upon a scale 27, so that the weight of the contents may be found at any time, and the density thereof readily determined so that the percentage of finely pulverulent metal catalyzer produced may be determined.

At the bottom of said receptacle or receiver 26, an outlet is provided having a valve 28, which communicates through a flexible pipe connection 29, with a pump 30. Leading upwardly from the pump 30, is a pipe 31, which communicates in the upper end of the receptacle 1, so that a continuous circulation of the oil and of the nickel or other catalyzer metal carried thereby may be maintained between the receptacle 1, and the receiver 26. Said pump 30 is driven from a drive shaft 32 upon which pulleys 33 and 34 are mounted, and about which a belt 35, is trained, said belt also being trained about one of the pulleys 22 and 23, as the case may be.

In the operation of the apparatus, oil is caused to circulate by the pump 30, through the pipe 31, to the space above the block 9, and is forced downwardly between the block 9 and the abrasive block 11. The abrasive block 11 is caused to rotate and is forced upwardly under pressure against the stationary nickel block 9, so that the nickel block is subjected to grinding or abrasion at the same time that the oil is circulated over the abraded nickel surface. The oil may itself carry finely divided abrasive which, in its passage between the abrading and abraded surfaces will further aid in the abrasion and in the maintenance of the catalytically active surfaces. The pressure of the abrasive block 11 may be varied by changing the number of weights 14 as will be readily understood. The finely pulverulent catalyzer particles produced will be carried away by the oil and will be recirculated therewith.

During the circulation of the oil, hydrogen is forced in under pressure through the pipe 5 and is forced through the opening in the block 9 and between the catalytically active surfaces of this block and the abrasive block 11. This oil is either preheated or is heated within the apparatus to the temperature required for hydrogenation, for example, around 150° to 200° C. The heating may be conveniently effected by the heating jacket illustrated. The oil will collect below the abrasive block in the lower part of the tank 1, and may be drawn off from time to time, or continuously through the pipe 25. The excess hydrogen may be similarly vented to enable a continuous flow of hydrogen over and above that required for the hydrogenation to take place. If the pipe 25 is open, both the oil and the hydrogen will flow out freely. By using a properly regulated outlet valve the apparatus may be maintained under any desired pressure, and the oil and hydrogen nevertheless continuously removed therefrom.

The catalytic hydrogenation will be promoted by the finely pulverulent catalyzer produced by the abrasion, as this catalyzer is recirculated with the oil and further brought into contact with the hydrogen at the proper temperature. The hydrogenation will also be effected by the catalytically active surfaces which will be maintained catalytically active by the abrasion at the same time that further amounts of finely pulverulent catalyzer are being produced.

Instead of effecting the abrasion by means of an abrasive block, grinding or acting upon nickel surfaces, a similar result can be obtained by the action of nickel surfaces upon nickel with the assistance of a finely divided abrasive carried by the oil which will be circulated with the oil and bring about abrasion of the nickel surfaces in its passage therebetween. A similar hydrogenation of the oil brought into contact with the catalytically active surfaces will be effected; and a similar production of finely pulverulent catalyzer which will further promote the hydrogenation. The fine catalyzer particles thus produced will themselves be recirculated and assist both in the further abrasion and maintenance of the catalytically active surfaces, and in the catalytical hydrogenation of the oil.

In the modified form of apparatus illustrated in Fig. 6, I have shown a tumbler or ball mill 36 of circular or polygonal shape, mounted in a frame 37, which is journaled in upright bearing standards 38, and capable of being rotated by a pulley 39 secured upon an extension of said frame. Extending into one end of the drum through the frame and bearing is an inlet pipe 41, and extending into the other end in a similar way is a similar pipe 42.

In the operation of this modified form of apparatus, a mixture of bulk nickel, preferably grain nickel or nickel shot, and preferably together with a finely divided abrasive, and a quantity of oil is introduced into the drum, the oil being introduced through the pipe 42. Hydrogen is introduced through the pipe 41. As the ball mill is rotated, the nickel shot or like nickel pieces are subjected to attrition and abrasion with the production of catalytically active surfaces and with maintenance of such catalytically active surfaces.

The drum is heated to the temperature appropriate to the catalytic hydrogenation, either by preheating the oil in any suitable manner or by providing the drum with heating means (not shown). The catalytically active surfaces produced are, during the rotation of the ball mill, brought up into the overlying atmosphere of hydrogen, so that the hydrogen and oil are brought into intimate contact therewith and hydrogenation effected. At the same time, finely pulverulent nickel catalyzer particles will be produced by the abrasion of the nickel surfaces and these minute particles will be picked up and enveloped by the oil and brought into reactive relation with the hydrogen so that hydrogenation by means thereof will also be effected to a greater or less extent.

During the progress of the ball mill operation, accordingly, the catalytically active surfaces will be produced and maintained, finely pulverulent nickel catalyzer particles will be produced, and hydrogenation will be effected. At the end of the operation, accordingly, there will result a composite product in the form of hydrogenized oil carrying therein finely pulverulent nickel catalyzer.

The ball mill operation can be carried out without the addition of an abrasive and the catalytically active surfaces nevertheless produced and maintained and finely pulverulent catalyzer produced therefrom by the attrition or abrasion of the nickel upon nickel; but this operation is relatively slow and for this reason is less advantageous than the method in which a finely divided abrasive is used as above described; and the use of such abrasive is accordingly to be recommended when the operation is carried out in a ball mill.

The ball mill illustrated in Fig. 6 may be provided with a suitable opening (not shown), for charging or discharging; the one end thereof may be removed to permit of charging and discharging with the bulk nickel.

The hydrogen may be introduced under any suitable pressure during the catalytic hydrogenation, and the hydrogenation may be carried out at any suitable temperature, for example, at temperatures around 150 to 200° C.

From the foregoing description it will be seen that the oil, together with hydrogen, are brought into contact with the catalytically active surfaces which are produced by mechanical means, at a temperature appropriate to the catalytic hydrogenation. It will be seen moreover that the catalytic activity of such surfaces is maintained during the progress of the hydrogenation, and that finely pulverulent catalyzer particles will be produced therefrom which are available for further promoting the hydrogenation. When a finely pulverulent abrasive is used, or when abrasive stones or blocks are caused to act upon the bulk nickel, there will be produced a composite product in the form of a mixture of finely pulverulent catalyzer and finely divided abrasive admixed with the hydrogenized oil; while the abrasive will assist in maintaining the nickel surfaces catalytically active.

Where a finely pulverulent nickel catalyzer is produced during the progress of the hydrogenation, this may be drawn off with the hydrogenized oil in suspension therein and utilized in the further hydrogenation of the same body of oil, or in the hydrogenation of further amounts of oil. This finely pulverulent nickel catalyzer, accordingly, is available for use generally, so that from one aspect, the process of the present invention may be considered as a process of producing a finely pulverulent catalyzer in a hydrogenized oil vehicle which is available for use for carrying out further hydrogenation, in various ways.

The process of the present invention is of particular value in connection with the production of finely pulverulent nickel catalyzers, and the hydrogenatioon of oil therewith, but the invention is not limited to the hydrogenation of oils, nor, in all cases, is it limited to nickel catalyzers and catalytically active nickel surfaces; athough I regard this as the most important and most advantageous embodiment of the present invention.

I do not claim herein, broadly, the catalytic hydrogenation of fatty oils and other liquids with a finely pulverulent catalyzer produced by mechanical means from raw nickel, inasmuch as such process in its broader aspects is claimed in a companion application; nor do I claim herein the process of producing the pulverulent catalyzer by mechanical means, except in combination with the simultaneous hydrogenation of oil, inasmuch as the catalyzer itself and its method of production are claimed broadly in a separate application.

What I claim is:

1. The method of effecting the hydrogenation of oils, which comprises causing the oil, together with hydrogen, to flow over catalytically active abraded nickel surfaces, at a temperature appropriate to the catalytic hydrogenation.

2. The method of effecting the hydrogenation of oil, which comprises causing the oil, together with hydrogen, to flow over catalytically active nickel surfaces having catalytic activity developed therein by mechanical means, and maintaining the catalytic activity of such surfaces during the hydrogenation by suitable mechanical action thereon.

3. The method of effecting the hydrogenation of oils, which comprises causing the oil, together with hydrogen, to flow over catalytically active abraded nickel surfaces, at a temperature appropriate to the hydrogenation, and subjecting such surfaces to abrasion to maintain the catalytic activity thereof during the hydrogenation operation.

4. The combined method of effecting hydrogenation and of producing a finely pulverulent nickel catalyzer, which comprises subjecting nickel surfaces to abrasion, and thereby imparting catalytic activity thereto, and producing therefrom a finely pulverulent nickel catalyzer, and simultaneously bringing the oil and hydrogen into contact with such surfaces and pulverized catalyzer at a temperature appropriate to the catalytic hydrogenation.

5. The combined method of effecting hydrogenation and of producing a finely pulverulent nickel catalyzer, which comprises subjecting substantially non-catalytic bulk nickel to attrition with the production of finely pulverulent nickel therefrom in a catalytically active state, and bringing the oil and hydrogen into contact with such bulk nickel and finely pulverulent nickel during such attrition and at a temperature appropriate to the catalytic hydrogenation.

6. The combined method of effecting hydrogenation of oils and of producing a finely pulverulent catalyzer in suspension therein, which comprises subjecting substantially non-catalytic bulk nickel to abrasion in a rotating tumbler or pebble mill, in the presence of oil and hydrogen and at a temperature appropriate to the catalytic hydrogenation.

7. The combined method of effecting hydrogenation of oils and of producing a finely pulverulent catalyzer in suspension therein, which comprises subjecting substantially non-catalytic bulk nickel, together with a finely-divided abrasive, to abrasion in a rotating tumber or ball mill, in the presence of oil and hydrogen and at a temperature appropriate to the catalytic hydrogenation.

In testimony whereof I have hereunto subscribed my name in the presence of two subscribing witnesses.

BENJAMIN W. ELDER.

Witnesses:
A. WIGHTMAN,
F. N. CLAFLIN.